E. F. AMES.
Improvement in Brush-Racks.

No. 130,401.    Patented Aug. 13, 1872.

UNITED STATES PATENT OFFICE.

EDWIN F. AMES, OF LANSINGBURG, NEW YORK, ASSIGNOR TO JOHN AMES, OF SAME PLACE.

IMPROVEMENT IN BRUSH-RACKS.

Specification forming part of Letters Patent No. 130,401, dated August 13, 1872.

Specification describing a new and useful Improvement in Brush-Rack, invented by EDWIN F. AMES, of Lansingburg, in the county of Rensselaer and State of New York.

Figure 1:
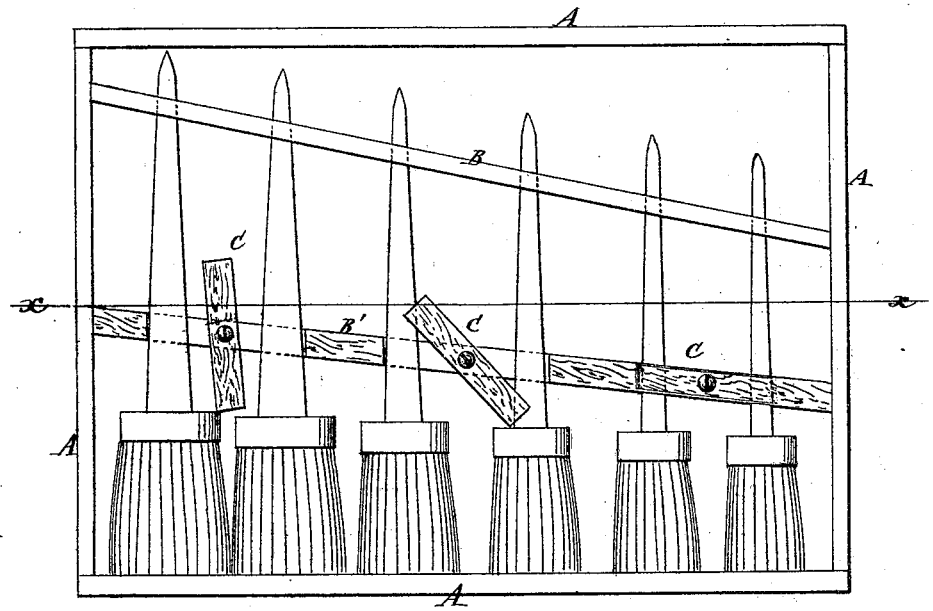
Figure 2:
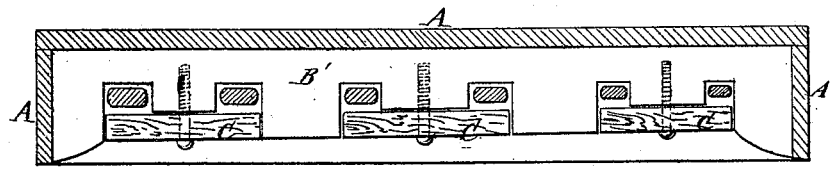

Figure 1 is a front view of my improved brush-rack. Fig. 2 is a detail horizontal section of the same taken through the line $x$ $x$, Fig. 1.

Similar letters of reference indicate corresponding parts.

My invention has for its object to improve the construction of the brush-rack for which Letters Patent No. 67,247 were issued to John Ames and N. H. Horton July 30, 1867, so as to make it more convenient in use; and it consists in the lower cleat made stationary, notched upon its forward edge, and provided with buttons, as hereinafter more fully described.

A is a rectangular box, made of such a size as to contain the desired number of brushes. B is the upper cleat, which is attached to the box A, and is provided with holes to receive the handles of the brushes, to be shown. About the construction of the parts A B there is nothing new. B' is the lower cleat, which is made stationary instead of being made movable, as in the original rack. In the cleat B' are formed holes to receive the handles of the brushes. The forward side of the cleat B', opposite and between the holes of each pair of holes, is cut away, said cut extending into the outer edges of the said holes, leaving the holes in the form of notches in the end parts of the long notches, as shown in Fig. 2. In the long notches thus formed are placed strips C, to serve as buttons to secure the brush-handles in place. The buttons C are pivoted at their centers to the timber between the holes of each pair of holes, as shown in Figs. 1 and 2, by a screw or other suitable means. The ends of the long notches and the ends of the buttons C are made slightly inclined, and the buttons C are made of such a length as to fit into the said notches exactly, so that they will be stopped when they come into line with the body of the cleat B'. By this construction by turning the buttons C into a vertical position the brushes can be conveniently removed and replaced.

With the original rack when the lower cleat was drawn outward to enable a brush to be removed, unless the greatest care was used, and sometimes even then, one or more of the other brushes would drop out. This annoyance is entirely remedied by my improvement, while at the same time the convenience of the person using the rack is very greatly increased.

Having thus described my invention, I claim as new and desire to secure by Letters Patent—

The lower cleat B', made stationary, notched upon its forward side, and provided with pivoted buttons C, in combination with the box A, and whether the upper cleat B be used or not, substantially as herein shown and described, and for the purpose set forth.

EDWIN F. AMES.

Witnesses:
JAMES T. GRAHAM,
T. B. MOSHER.